United States Patent [19]
Carlson

[11] Patent Number: 5,680,417
[45] Date of Patent: Oct. 21, 1997

[54] METHOD AND APPARATUS FOR PROVIDING BIPHASE MODULATION

[75] Inventor: Dennis H. Carlson, Arlington Heights, Ill.

[73] Assignee: Motorola, Inc., Schamburg, Ill.

[21] Appl. No.: 320,364

[22] Filed: Oct. 11, 1994

[51] Int. Cl.$^6$ .............................. H04B 3/00; H04L 25/00
[52] U.S. Cl. .................. 375/257; 375/282; 375/283; 375/308; 332/103; 332/146; 333/164
[58] Field of Search .................................. 375/279, 282, 375/283, 257, 308, 312; 332/103, 112, 144, 146; 333/164

[56] References Cited

U.S. PATENT DOCUMENTS

| | | | |
|---|---|---|---|
| 4,726,039 | 2/1988 | Piesinger | 375/308 |
| 4,994,773 | 2/1991 | Chen et al. | 333/164 |
| 5,081,432 | 1/1992 | Devlin et al. | 332/103 |
| 5,453,720 | 9/1995 | McCullough et al. | 375/282 |

OTHER PUBLICATIONS

IEEE Transactions on Microwave Theory and Techniques, May "Broad–Band Diode Phase Shifters" vol. MTT–20, No. 5, pp. 314–323.

IEEE Transactions on Microwave Theory and Techniques, "A New Class of Broad–Band Microwave 90–Degree Phase Shifters", pp. 232–237.

IEEE Transactions on Microwave Theory and Techniques, Sep. "A Broad Band Frequency Translator with 30–dB Suppression of Spurios Sidebands", pp. 651–652.

Merrimac Model M–109A, Model 117A, BPF–2A Series and BPP–2N Series "BiPhase Modulators", 6 sheets.

IEEE Transactions on Microwave Theory and Techniques, Jan. "Broadband Binary 180° Diode Modulators", pp. 32–38.

IEEE Transactions on Microwave Theory and Techniques, Mar. "High Powser, p–i–n Diode Controlled, Microwave Transmission Phase Shifters", pp. 233–242.

Mini–Circuits, Section II "ISQ and QPSK Modulators and Demodulators" Modulators pp. 11–2, 11, 8, 11–9 and 11–11.

RF and Microwave Components Designers' Handbook, Watkins–Johnson Company, 1990–1991 "Microwave Switch Selection Techniques" pp. 784–790.

Articles "Biphase and Quadriphase Digital Modulators" pp. 242–244, Double Balanced Mixers 1967 International Solid State Circuits Conference, pp. 234–241.

ISSCC 67, Microwave Integrated Circuits, "Hybrid Integrated–Circuit digital Phase Shifters" pp. 58–59.

Hittite Microwave Corporation "Ga–As MMIC Bi–Phase Modulator" HMC135 May 1993, 1 sheet.

*Primary Examiner*—Stephen Chin
*Assistant Examiner*—Don Vo

[57] ABSTRACT

A binary phase shift keyed (BPSK) modulator (200) used for digital phase modulation is shown. Phase shift is achieved by electrically switching an RF input signal (201) through either a direct signal path (203) or through a half wave transmission signal path (205) to shift its phase by 180 degrees. Both the data signal (211) and its complement (213) are used to turn on one of PIN diodes (207, 209) while simultaneously turning off the other diode with reverse bias. This technique allows for obtaining maximum diode isolation. The BPSK modulator (200) has the advantages of very low insertion loss, dc coupling for low frequency modulation components and high performance with minimum parts.

10 Claims, 2 Drawing Sheets

5,680,417

METHOD AND APPARATUS FOR PROVIDING BIPHASE MODULATION

TECHNICAL FIELD

This invention relates in general to modulators and more particularly to biphase modulators.

BACKGROUND

Modulators are systems which enable information, contained in a baseband signal, to be transferred to an RF carrier signal so the information may be transmitted over some medium to a receiver. The information may be transferred to the RF carrier by causing the amplitude, frequency, or phase of the carrier to vary in accordance with the information contained in the baseband signal. This results in amplitude modulation (AM), frequency modulation (FM), or phase modulation (PM) respectively.

Typically, the baseband signal, also known as the modulating signal, may contain continuously variable signal levels resulting in analog modulation of the carrier or it may contain discrete levels resulting in digital modulation of the carrier. Digital phase modulation of an RF carrier by a binary (2 state) baseband signal is referred to as Binary Phase or "BiPhase" Shift Keying (BPSK).

As is known in the prior art, such a modulator can be implemented either with passive or active circuits. An active circuit implementation typically uses the Gilbert cell circuit while the passive implementation typically uses a double balanced mixer (DBM) comprised of a Schottky diode ring and two RF transformers.

The Gilbert cell circuit and the DBM allow an information bearing binary signal to switch the phase of the RF signal appearing at the output of the modulator between two phase states—the difference of which is 180 degrees. Hence, with these devices either of two phases of an RF carrier correlated to a binary signal can be transmitted over a medium to a receiver which converts the two phases back into the original baseband signal. DBM's are constructed using a four diode Schottky ring in conjunction with two RF transformers. These products are typically built with discrete parts although at least one known configuration uses an integrated design whereby both the Schottky diode ring and the transformers are constructed on a Microwave Monolithic Integrated Circuit (MMIC).

There are several drawbacks to both the discrete and integrated implementations of the double balance mixer for use as a biphase modulator. Most discrete DBM's require a bipolar binary signal to switch the diodes for the two phase states. However, typical logic circuits used to produce binary signals have a unipolar output (e.g. 0–5 volts rather than −5 to +5 volts). This problem can be alleviated by capacitively coupling the unipolar binary signal to the DBM but this imposes another problem on the modulator i.e. poor response to low frequency components of the modulating signal. The MMIC version of the DBM suffers not only from the above described limitation but also it has an approximately 10 db insertion loss to the RF signal and has a very poor impedance match to 50 ohms at its input and output.

Therefore it is evident there is a deficiency among the prior art implementations of the biphase modulator. Namely, they require that a bipolar data signal, which is usually not available in communications equipment, be used to control the phase state switching devices. In lieu of the bipolar signal, a unipolar data signal, which is commonly found in communications equipment, may be capacitively coupled to the modulator to effect the same switching characteristics as achieved with a bipolar signal. This latter approach, however, imposes a performance restriction on the low frequency content of the modulating data signal.

Prior art implementation that attempts to miniaturize the prior art discrete versions of the biphase modulator through MMIC techniques suffer not only from the same bipolar/unipolar conflicts, but also have high insertion loss and poor impedance match to the RF signal.

Therefore, it is evident a device offering improved characteristics would be highly useful in communications systems utilizing digital biphase modulation.

DETAILED DESCRIPTION OF THE PREFERRED EMBODIMENT

Figure 1:
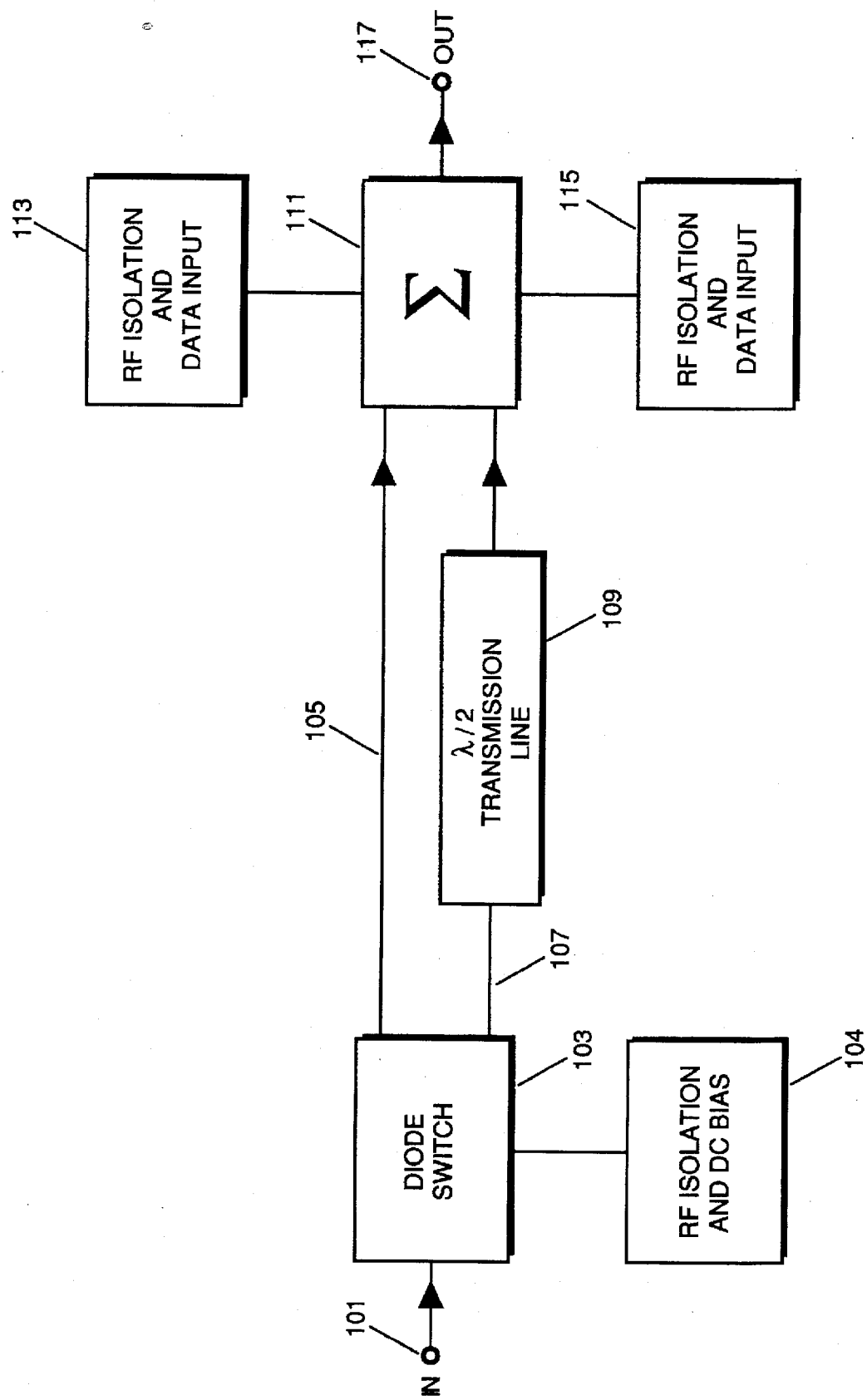
FIG. 1 is a block diagram showing the operation of the preferred embodiment of the present invention.

FIG. 1, shown at 100, is a block diagram depicting the operation of a preferred embodiment of the invention. An RF continuous wave (CW) signal, typically at 2.1 GHz, is applied to a diode switch 103 via input 101. The diode switch 103 is controlled by the binary data signals at input 113 and input 115 in conjunction with the DC bias circuit 104. The diode switch 103 directs the CW signal to either of two signal paths 105 or 107. Signal path 107 includes a halfwave transmission line 109 which provides a 180 degree phase shift of the CW signal. Signal paths 105, 107 and transmission line 109 are joined at a summing junction 111. Thus, either the input CW signal or the input CW signal shifted by 180 degrees appears at this junction depending on the state of switch 103. The data signal, controlling diode switch 103, is applied to the summing junction 111 through RF isolation transmission lines 113 and 115. The RF isolation and DC bias circuit 104 are used in conjunction with the data signal at input 113 and input 115 to control switch 103.

A binary data signal is DC coupled to diode switch 103 and switches the input CW signal through either a direct signal path 105 or a 180 degree phase shifted signal path 107 to the output at 117. As a result, the input signal is phase shifted between two phase states, the difference of which is 180 degrees, in accordance with the binary data signal to produce a BPSK output signal at output 117.

Figure 2:
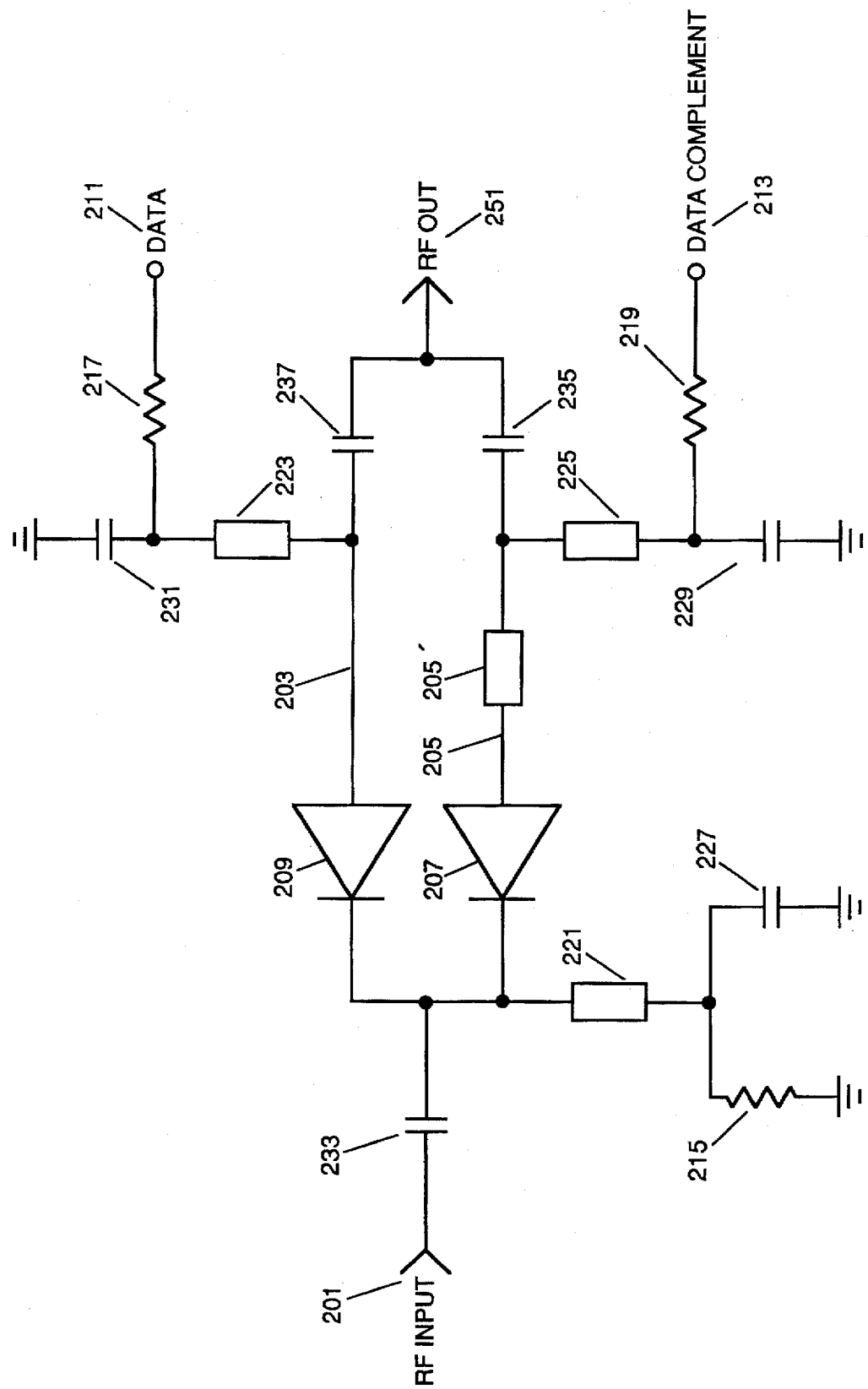
FIG. 2 is a schematic diagram of the BPSK modulator shown in FIG. 1.

FIG. 2 is a schematic representation of the binary phase shift keyed (BPSK) modulator 200. The modulator 200 generally operates at a minimal carrier frequency of 2.1 GHz. It should be recognized by those skilled in the art that although 2.1 GHz is used here by way of example, any frequency at generally 2.1 GHz or above may be used. Phase shift is achieved by electrically switching the RF signal (i.e. the CW signal at the input port 201) between either a direct signal path 203 or a signal path 205 containing a halfwave transmission line 205' which shifts the phase of the signal by 180 degrees. The halfwave transmission line 205' may be a commonly used microstrip transmission line or the like consisting of a conductive runner of predetermined dimensions on substrate material such as alumina. Switching is achieved using information bearing binary digital signals 211, 213 to control two PIN diodes 207 and 209 which may be HPND-4018 manufactured by Hewlett-Packard or the like.

Data signal 211 and data complement signal 213 bear the information to be placed on the CW carrier signal at the input port 201 of the modulator 200. The levels of data signal 211 and data complement signal 213 are typically 0 volts for a logic 0 and nominally 5 volts for a logic 1 although other values may be selected. During modulation, while the data signal 211 or complement signal 213 is at +5 volts, the other is at 0 volts. For these levels, the voltage across resistor 215 is nominally 3.75 volts independent of whether data signal 211 or data complement signal 213 is at a high or low level. When forward biased at approximately 10 ma, diode 207 and diode 209 exhibit a very low resistance resulting in a theoretical insertion loss of 0.3 dB as measured in a 50 ohm system. When reverse biased with 3.75 volts, diodes 207 and 209 exhibit a high capacitive impedance equivalent to approximately 0.03 pf.

During operation, when data signal 211 is at +5 volts, diode 209 is forward biased and the current through it is limited by resistor 215 and resistor 217 to 8–10 ma. Under these conditions data complement signal 213 is at 0 volts and diode 207 is turned off with a reverse bias voltage of 3.75 volts, the voltage appearing across resistor 215. The RF signal at the input port 201 of the modulator 200 is thus connected to the output port 251 through diode 209 via signal path 203. Conversely, when data complement signal 213 is at +5 volts, diode 207 is forward biased and its current is limited to 8–10 ma by resistor 215 and resistor 219. The data signal 211 is at 0 volts; diode 209 is off and reverse biased by 3.75 volts, which is the voltage appearing across resistor 215. The RF signal input at input port 201 is now directed to the output port 251 through diode 207 and the halfwave transmission line 205' via signal path 205.

Quarter wave transmission lines 221, 223 and 225 serve as RF chokes which isolate the RF signal at input port 201 from the modulating signal. To the data or information bearing data signal, quarter wave transmission lines 221, 223, and 225 appear simply as conductors. Capacitors 227, 229 and 231 act as RF short circuits producing RF open circuits at the opposite ends of their respective quarter wave transmission lines. As a result, these quarter wave transmission lines appear as open circuits to the RF signal input at input port 201 thereby providing isolation. Additional capacitance, used in conjunction with resistors 217 and 219, may be added in parallel with capacitor 229 and capacitor 231 to provide low pass filtering of the data signals at input 211 and input 213.

It will be recognized by those skilled in the art that there is parasitic capacitance to ground due to the metalization on which the DC blocking capacitors 233, 235 and 237 are mounted. The parasitic capacitance adds a reactive component to the input/output impedance of modulator 200. This can be easily tuned out by shortening the quarter wave transmission lines 221, 223, 225 as follows. At its open end, a shorted quarter wave transmission line may be modeled as a parallel LC circuit resonating at the nominal frequency of the RF input signal. The parasitic capacitance is in parallel with this LC circuit and lowers its resonant frequency. Shortening the transmission line effectively lowers the inductance of the LC circuit so that the resonant frequency can be raised back up to the nominal operating frequency. As a result, the parasitic capacitance is eliminated or tuned out. As built in this modulator, the quarter wave transmission lines 221, 223 and 225 are slightly shorter than an actual quarter wave length to optimize the input/output impedance of the modulator 200.

Halfwave transmission line 205' is used to produce a 180 degree phase shift in the RF input signal applied at input port 201 as it traverses through the signal path 205 to the output port 251. Halfwave transmission line 205' is exactly one half wavelength at the desired operating frequency. When diode 209 is turned on by the modulating signal 211 the RF input CW signal at input port 201 is connected to the RF output port 251 and is shifted in phase an amount φ, determined by the physical layout of signal path 203. The signal path 205 containing diode 207 is identical in layout with the exception of the addition of the halfwave element 205' which provides a 180 degree phase shift. Consequently, when diode 207 is turned on, the RF input signal applied at input port 201 is connected to the RF output port 251 and shifted in phase by φ plus 180 degrees. Hence, the phase difference between the two possible output signals is 180 degrees resulting in a 180 degree biphase modulation impressed on the RF input signal applied at input port 201. If the layouts of the common parts of the direct signal path 203 and the phase shifted signal path 205 are slightly different, the difference in φ between the two signal paths can be compensated for by adjusting the length of halfwave transmission line 205' so that the phase difference between the two signal paths is exactly 180 degrees.

The preferred method of practicing the invention involves modulating an input signal with a data signal utilizing a biphase modulator. The method includes receiving an RF CW input signal at a predetermined frequency generally 2.0 GHz or above. The input signal is then switched using a diode switch between a plurality of signal paths based on the state of a first and second binary data signal which is supplied to the modulator. Since one of the signal paths includes a means for phase shifting, this has the result of changing the phase of the input signal based on the switching of the diode switch. The phase of the signal may be changed 180 degrees using a halfwave transmission line or the like. Finally the input signal is combined with either of said first or second data signals to produce a biphase modulated output signal.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A bi-phase modulator for imposing data upon an radio frequency (RF) carrier signal comprising:

an RF input for supplying a first signal at a predetermined frequency; at least one data input for supplying a second signal to modulate said first signal;

a pin diode switch for switching said first signal between a first signal path and a second signal path; and wherein said first signal path includes a phase delay using a single halfwave transmission line for shifting the phase of said first signal a predetermined amount for combination with said second signal.

2. A bi-phase modulator as in claim 1 wherein said first signal is an RF continuous wave signal at a predetermined frequency.

3. A bi-phase modulator as in claim 1 wherein said second signal includes data and control information to said diode switch.

4. A bi-phase modulator for providing a digital phase modulated output signal comprising:

a plurality of signal paths each including at least one isolating means for isolating a data signal from an output signal;

a pin diode switch attached to a radio frequency (RF) input signal for switching said input signal between said plurality of signal paths;

a half-wave transmission line attached to at least one of said plurality of signal paths for providing a 180 degree phase shift of the RF input signal; and wherein each one of said plurality of signal paths is connected to at least one data signal where said RF input signal is modulated with one of said plurality of data signals to provide said digital phase modulated output signal.

5. A bi-phase modulator as in claim 4 wherein the half-wave transmission line is a microstrip transmission line.

6. A bi-phase modulator as in claim 4 wherein said switch means further includes an second isolation means for isolating said RF input signal from said output signal.

7. A bi-phase modulator as in claim 6 wherein said second isolation means includes a transmission line which is one quarter wavelength of said RF input signal.

8. A method of modulating an input signal with a data signal utilizing a biphase modulator including the steps of:

receiving an radio frequency (RF) input signal;

switching the RF input signal between a plurality of signal paths based on the state of a first data signal and a second data signal using a pin diode switch;

changing the phase of the RF input signal using a half-wave transmission line on at least one of the plurality of signal paths to provide a shifted input signal; and combining the shifted input signal with either of said first data signal or second data signal to produce a biphase modulated output signal.

9. A method as in claim 8 further including the step of:

isolating the RF input signal from the biphase modulated output signal using at least one quarter wavelength transmission signal path.

10. A method as in claim 8 further including the step of:

isolating the first data signal and the second data signal from the biphase modulated output signal using a quarter wavelength transmission signal path.

* * * * *